UNITED STATES PATENT OFFICE.

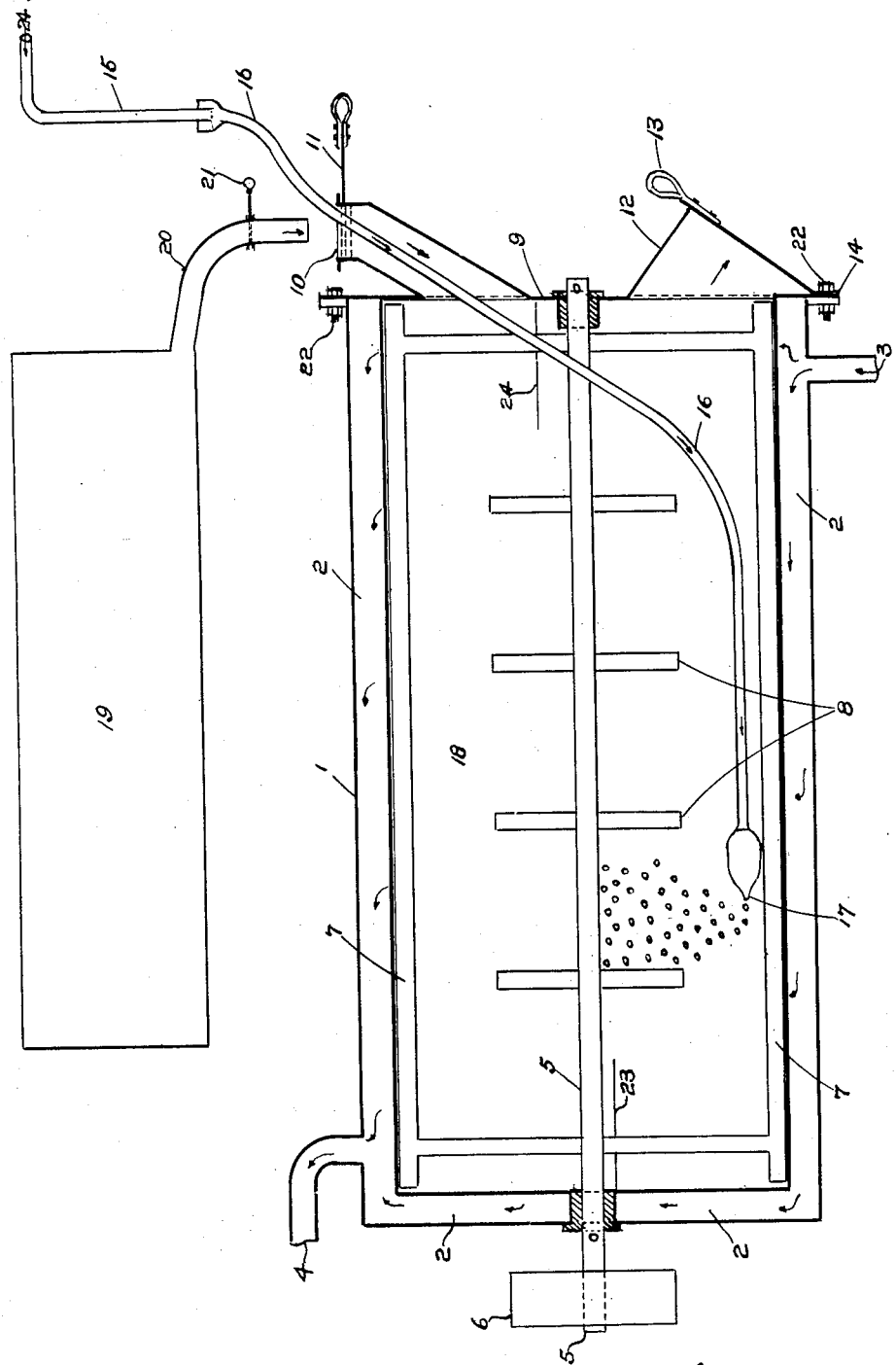

ROBERT J. KIRKPATRICK, SEVERN M. SWORDLING, AND WILFRID PAUL HEATH, OF SPOKANE, WASHINGTON.

ICE-CREAM-FREEZING PROCESS.

1,329,246.  Specification of Letters Patent.  Patented Jan. 27, 1920.

Application filed December 16, 1918. Serial No. 266,856.

*To all whom it may concern:*

Be it known that ROBERT J. KIRKPATRICK, SEVERN M. SWORDLING, and WILFRID PAUL HEATH, citizens of the United States of America, residing at Spokane, in the county of Spokane and State of Washington, have invented new and useful Improvements in Ice-Cream-Freezing Processes, of which the following is a specification.

Our invention relates to methods of freezing ice cream, sherbet, whipped cream, frozen desserts or any article artificially prepared and frozen and intended for human consumption where it has been the intention to decrease the specific gravity of the product by the incorporation of air.

An object of our invention is to control the character of the gas entering into ice cream, or other frozen products. In plants where such products have been made the decrease in specific gravity has been due to the incorporation of air only. Our invention provides for the substitution of another gas or gases, that is a sterile inert gas or gas without chemical action on the substances acted on, either wholly or in part for the customary air so that the partially frozen emulsion as it issues from the freezer, instead of containing air cells to lighten its weight may have carbon dioxid (carbonic acid gas) or other inert gas, the same imparting to the product unique, new and desirable, and hitherto unknown qualities.

The air incorporated in ice cream and other frozen products is too often tainted and germ laden. With our method carbon dioxid, either wholly or in part, may be incorporated in the mix in the freezer by substituting carbon dioxid for air, the carbon dioxid either issuing from a cylinder under pressure into the freezer, or from some other source of supply.

The buyer of ice cream today gets nearly half a gallon of air, by volume, with each gallon of ice cream. This is often a polluted air from the creamery or ice cream plant, unpurified, unsterilized, and alive with bacterial life. The customer would much prefer that in his gallon of ice cream the gas be of oxygen, wholly or in part, since it would materially lessen the bacteria count of the ice cream, make the product a purer one, more sanitary and of better dietetic properties.

Through our process, also, gaseous flavors or "bouquets" may be imparted to the ice cream or frozen foods.

Our process provides for filling the space above the mix in the freezer with the desired gas or combination of gases and for preventing the mix from incorporating other than the desired combination. This may be attained in any type of freezer by limiting the number of gates to two; the lower one through which the whipped emulsion of partially frozen ice cream passes when done and the upper one through which the mix passes into the freezer. This upper gate is so constructed that as soon as the mix has passed into the freezer a rubber tube may be inserted into the freezer through which the desired gas is forced until it escapes through the upper gate. The tube is then withdrawn and the gate closed tight. The freezer scrapers and dashers are then put in motion and the mix can only absorb the desired gases. The lower gate may have a hole machined in it and a valve attached, so that by coupling up with gas supply a continuous stream of gas may enter the freezer during agitation. To prevent too great a pressure the upper gate may be provided with an escape vent, or if it is desired to freeze under pressure it may be provided with a pop valve set to the desired pressure point.

If it be desired to run a continuous stream of gas into the freezer through the valve in lower gate, the gas may be previously chilled to a low temperature to assist the brine circulation in more quickly freezing the mix.

We have accompanied this application with a diagram in which we have shown a horizontal style of ice cream freezer 1. An outer casing 2 has mounted therein a container cylinder 7, lengthwise of which is horizontally mounted a shaft 5, to which are attached whipping blades or beaters 8. The shaft 5 is adapted to rotate in bearings in the end walls of the casing 2. Brine intake 3 and exit 4 are shown mounted on the end of the shaft 5. Outside of the casing 2 is a band-wheel 6, by means of which power is conveyed to rotate the cylinder 5. An ice cream mix holder is shown mounted above the casing 2, the same having an outlet tube 20 leading to the opening 10 by means of which the mix is conveyed to the interior 18 of the cylinder 7. The opening 10 is in the front wall 9 of the casing 2 and can be securely closed by means of a slide gate 11. A lower draw gate 12 is also shown in the front wall 9 which is manually operative to open and close by means of a handle 13. The gate 12 is hinged at 14. The front end 9 of the casing is shown as removably attached to the body 2 of the casing by means of the bolts 22. As a means of injecting the gaseous substance into the mix in the cylinder 7 we have shown a flexible tube 16 reaching through the opening 10 and into the cylinder 7 the same having a sinkable head 17 through which the gas escapes into the mix. The flexible tube 16 is connected to a conduit 15 the end 24 of which connects with a cylinder under pressure, or other means of gas supply. The mix is first turned into the cylinder 7 and we will assume that the same fills the cylinder 7 to the line 23. The gas is then turned in through the flexible tube 16 to fill the remainder of interior 18, driving out the air. Then the tube 16 is withdrawn and the gate 11 closed shutting off the opening 10. We will assume again that after the product is frozen the cylinder content will reach the line 24. As hereinbefore stated if it is desired to supply the gas during the freezing process, provision may be made to take the same in through the lower portion of the front end 9 or through the gate 12, provision having been made for a gas-tight fit at the point of gas connection and by having the gate 11 partially open to permit the displaced air to escape through the opening 10.

What is claimed is—

1. The process of making ice cream and other frozen foods, consisting in placing the food ingredients, in a liquid condition, in a refrigerating container, forcing a sterile inert gas into said container and thereby replacing the air therein, and agitating said ingredients while in said container and under pressure of said gas, to cause said gas to become incorporated and to commingle with said ingredients as they pass from a liquid to a solid or plastic condition.

2. The process of making ice cream and other frozen foods, consisting in placing the food ingredients, in a liquid condition, in a refrigerating container, forcing carbon dioxid gas into said container and thereby replacing the air therein and agitating said ingredients while in said container and under pressure of said gas, to cause said gas to become incorporated and to commingle with said ingredients as they pass from a liquid to a solid or plastic condition.

In testimony whereof we affix our signatures in the presence of two witnesses.

ROBT. J. KIRKPATRICK.
SEVERN M. SWORDLING.
WILFRID PAUL HEATH.

Witnesses:
  FLOSSIE A. LEWIS,
  EDNA G. LEWIS.